(12) United States Patent
Muthusamy et al.

(10) Patent No.: US 8,695,704 B2
(45) Date of Patent: Apr. 15, 2014

(54) CONTROLLED RELEASE BREAKER COMPOSITION FOR OIL FIELD APPLICATIONS

(75) Inventors: Ramesh Muthusamy, Dharmapuri District (IN); Prajakta R. Patil, Pune (IN); Nisha A. Pandya, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 175 days.

(21) Appl. No.: 13/292,304

(22) Filed: Nov. 9, 2011

(65) Prior Publication Data
US 2013/0112413 A1    May 9, 2013

(51) Int. Cl.
E21B 43/267 (2006.01)
E21B 43/22 (2006.01)
C09K 8/62 (2006.01)
C09K 8/68 (2006.01)
C09K 8/80 (2006.01)
C09K 8/92 (2006.01)

(52) U.S. Cl.
CPC ............... *E21B 43/267* (2013.01); *C09K 8/80* (2013.01); *C09K 8/92* (2013.01); *C09K 8/685* (2013.01)
USPC .................. 166/283; 166/280.1; 166/308.5

(58) Field of Classification Search
CPC combination set(s) only.
See application file for complete search history.

(56) References Cited

U.S. PATENT DOCUMENTS

| | | | |
|---|---|---|---|
| 4,506,734 A | 3/1985 | Nolte | |
| 4,741,401 A | 5/1988 | Walles et al. | |
| 5,164,099 A | 11/1992 | Gupta et al. | |
| 5,437,331 A | 8/1995 | Gupta et al. | |
| 5,591,700 A | 1/1997 | Harris et al. | |
| 6,138,760 A | 10/2000 | Lopez et al. | |
| 6,225,262 B1 | 5/2001 | Irwin et al. | |
| 6,357,527 B1 | 3/2002 | Norman et al. | |
| 6,818,594 B1 | 11/2004 | Freeman et al. | |
| 7,334,640 B2 | 2/2008 | Hanes, Jr. et al. | |
| 7,687,441 B2 | 3/2010 | Hanes, Jr. et al. | |
| 2006/0081369 A1 | 4/2006 | Kriegel | |
| 2006/0289160 A1 * | 12/2006 | van Batenburg et al. | 166/280.2 |
| 2008/0277112 A1 | 11/2008 | Welton et al. | |

FOREIGN PATENT DOCUMENTS

WO    2013070360 A1    5/2013

OTHER PUBLICATIONS

International Search Report and Written Opinion for PCT/US2012/059207 dated Jan. 25, 2013.

\* cited by examiner

*Primary Examiner* — Zakiya W Bates
(74) *Attorney, Agent, or Firm* — McDermott Will & Emery LLP; Craig W. Roddy

(57) ABSTRACT

The present invention relates to encapsulated breakers and the use of encapsulated breakers for breaking viscosified treatment fluids. One embodiment of the present invention provides a method of providing a viscosified treatment fluid having a first viscosity having a gelling agent, a crosslinking agent, a proppant, an aqueous-base fluid, and an encapsulated breaker composition having an encapsulant that has a poly (meth)acrylate blend; introducing the viscosified treatment fluid in the subterranean formation; creating or enhancing a fracture in a subterranean formation; and allowing the encapsulated breaker composition to release the breaker so as to reduce the viscosity of the viscosified treatment fluid to a second viscosity.

19 Claims, 7 Drawing Sheets

CONTROLLED RELEASE BREAKER COMPOSITION FOR OIL FIELD APPLICATIONS

BACKGROUND

The present invention relates to compositions and methods for treating subterranean formations. In particular, the present invention relates to encapsulated breakers and methods for breaking viscosified treatment fluids utilized in the treatment of subterranean formations.

Viscosified treatment fluids are used in subterranean formations for a variety of applications. These subterranean viscosified treatment fluids include fracturing fluids, drilling fluids, diverting fluids, and gravel packing fluids. Subterranean viscosified treatment fluids often utilize gelling agents that can increase their viscosity. Biopolymer and synthetic polymers are two of the most common types of gelling agents used in subterranean applications. More specific examples of gelling agents include, but are not limited to, galactomannan gums, such as guar and locust bean gum, cellulosic polymers, and other polysaccharides. These gelling agents can increase a fluid's viscosity which may be important for a number of reasons in subterranean applications. For example, an increase in viscosity is important for transferring hydraulic pressure to divert treatment fluids to another part of a formation or for preventing undesired leak-off of fluids into a formation from the buildup of filter cakes.

While it is important to monitor and increase the viscosity of a viscosified treatment fluid, it is often desirable to reduce the viscosity of a viscosified treatment fluid at a later time. For example, in the case of fracturing fluids, a sufficiently high viscosity is needed to retain the proppant particulates in suspension or at least to reduce the tendency of the proppant particulates to settle out of the fracturing fluid as the fracturing fluid flows along the created fracture. Once the fracturing fluid has performed its intended function, it is often desirable to lower the viscosity of the fracturing fluid to allow flow back of the spent fracturing fluid or following a treatment as part of the fluid-disposal process. The removal of the spent fracturing fluids from the subterranean formation is typically required to allow hydrocarbon production.

This reduction in viscosity of the fracturing fluid is often achieved by introducing a breaker to the fluid that breaks the cross-linking bonds of the polymer gels. A breaker can be incorporated into the fracturing fluid. However, this technique can be unreliable and sometimes results in incomplete breaking of the fluid and/or premature breaking of the fluid before the fracturing process is complete. It is generally desirable to break the fracturing fluids as soon as possible to start the recovery of hydrocarbons without prematurely breaking the fracturing fluid, which can decrease the number or length of fractures obtained and thus, the amount of hydrocarbon recovered.

Furthermore, commonly available breakers such as enzymes often degrade at moderate to relatively high temperatures. On the other hand, oxidizers used at relatively high temperatures often break gels at narrow temperature ranges which leads to rapid decrease in gel viscosity before completion of a subterranean operation. For example, sodium persulfate breaks gels at moderate temperatures (65° C. or 149° F.) and thus, its utility in controlled fracturing operation at higher temperature is limited. While encapsulation techniques have been used to form protective coatings around breakers, commonly available encapsulated breakers typically only work at low to moderate temperatures. For example, encapsulated sodium persulfate (commercially available as OPTIFLO II™ and OPTIFLO III™ from Halliburton Energy Services, Inc.) works only up to about 52° C. (125° F.) and 93° C. (200° F.) respectively.

SUMMARY OF THE INVENTION

The present invention relates to compositions and methods for treating subterranean formations. In particular, the present invention relates to encapsulated breakers and methods for breaking viscosified treatment fluids utilized in the treatment of subterranean formations.

In some embodiments, the present invention provides methods comprising: providing a viscosified treatment fluid having a first viscosity comprising: a gelling agent, a crosslinking agent, a proppant, an aqueous-base fluid, and an encapsulated breaker composition comprising: an encapsulant that comprises a poly(meth)acrylate blend; introducing the viscosified treatment fluid in the subterranean formation; creating or enhancing a fracture in a subterranean formation; and allowing the encapsulated breaker composition to release the breaker so as to reduce the viscosity of the viscosified treatment fluid to a second viscosity.

In other embodiments, the present invention provides methods comprising: providing a viscosified treatment fluid having a first viscosity comprising: a crosslinked gelling agent formed by a reaction comprising a gelling agent and a crosslinking agent, a proppant, an aqueous-base fluid, an encapsulated breaker composition that comprises an encapsulant that comprises a poly(meth)acrylate blend; introducing the viscosified treatment fluid in the subterranean formation; creating or enhancing a fracture in a subterranean formation; and allowing the encapsulated breaker composition to release the breaker so as to reduce the viscosity of the viscosified treatment fluid to a second viscosity.

In still other embodiments, the present invention provides encapsulated breaker compositions comprising: a breaker comprising at least one breaker selected from the group consisting of: an enzyme, an oxidizer, a chelator, an acid; and an encapsulant that comprises a poly(meth)acrylate blend, wherein the encapsulant encapsulates the breaker.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

Figure 1:
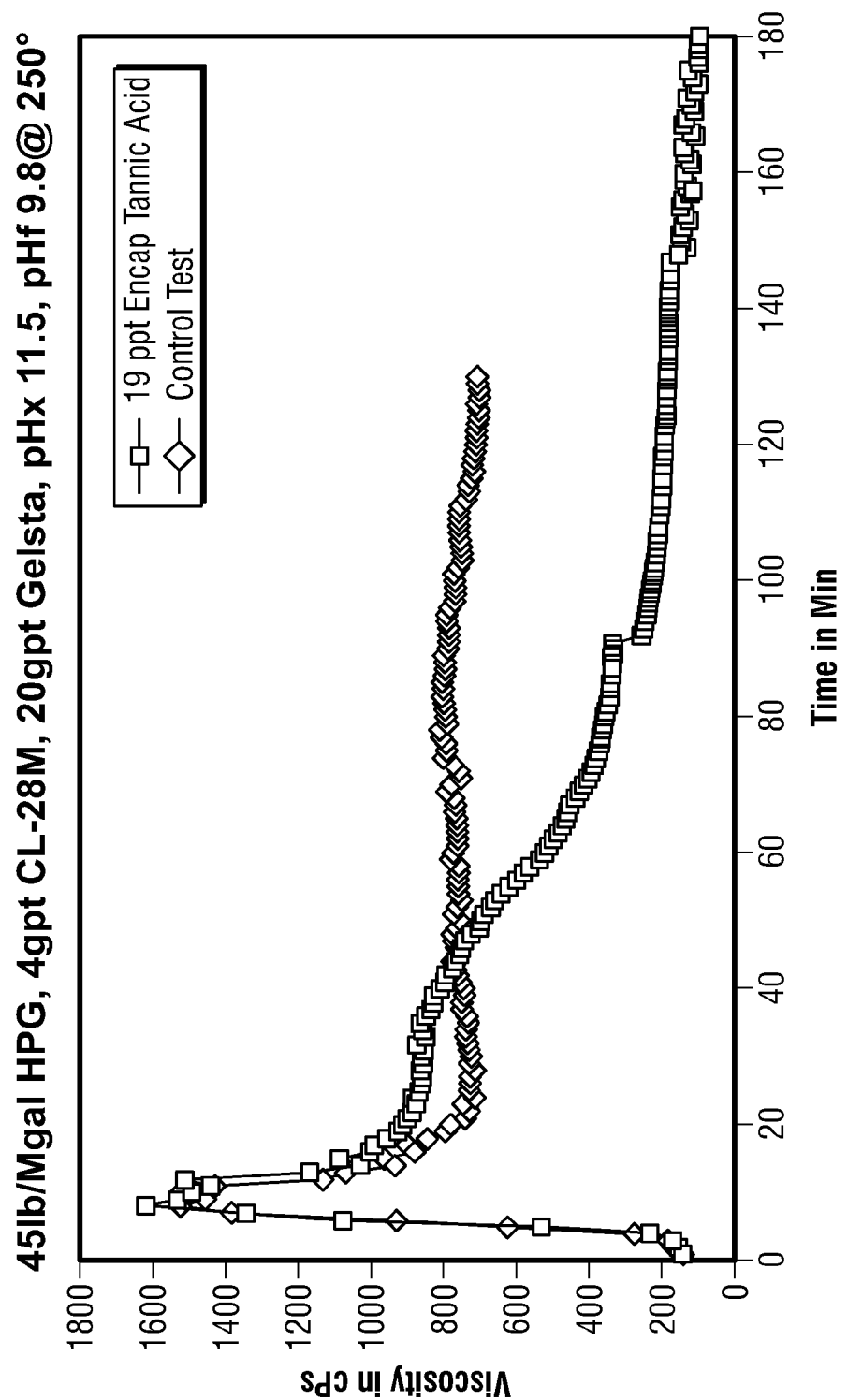
FIG. 1 shows rheological tests performed as described in Example 2.

The present invention relates to compositions and methods for treating subterranean formations. In particular, the present invention relates to encapsulated breakers and methods for breaking viscosified treatment fluids utilized in the treatment of subterranean formations. Generally, the encapsulated breaker compositions of the present invention can be added to any subterranean treatment fluid known in the art to reduce its viscosity. Suitable examples of subterranean treatment fluids include, but are not limited to, fracturing fluid, carrier fluid, diverting fluids, gravel packing fluids, and the like.

The encapsulated breaker compositions of the present invention provide controlled breaking of viscosified treatment fluids. Breaking a viscosified treatment fluid effectively reduces the viscosity of a viscosified treatment fluid to a second viscosity, which is lower than the first viscosity of the viscosified treatment fluid. Viscosified treatment fluids are typically viscosified by crosslinked gels that are often crosslinked through a crosslinking reaction involving a gelling agent and crosslinking agent.

As used herein, the term "controlled breaking" generally refers to methods of breaking in which breaking of fracturing fluid has been delayed at least for about an hour.

Controlled breaking may occur in a variety of ways. For example, the kinetic rate of breaking may be delayed (e.g., by controlling temperature and/or concentration) or preferably, the release of a breaker may be delayed (i.e., controlled release of a breaker encapsulated by an encapsulant). The encapsulants are essentially protective coatings that are thermally stable and do not degrade upon contact with breakers. The nature (e.g., length) of the delay will depend largely on the specific breaker, the encapsulant and concentration used. The controlled release of breakers may occur through a number of mechanisms involving the removal of encapsulant including, but are not limited to, degradation, biodegradation, solvation, and the like. In some cases, the release of breaker may also occur by diffusion without removal of encapsulant. In some cases, the delay may correspond to a certain event (e.g., once fracturing fluid is spent) at which point a reduction in viscosity may be desirable.

The encapsulated break compositions of the present invention are particularly useful at relatively high temperature ranges (e.g., between 66° C. or 150° F. to 149° C. or 300° F.). It is believed that these temperatures are significantly higher than the workable temperature ranges for conventional encapsulated breakers, which represents a distinct advantage. At these temperatures, breaking (e.g., by persulfates) is often difficult to control and/or occurs rapidly.

Yet another advantage is that the encapsulant used in the present invention is useful for a variety of breakers including, but are not limited to, oxidizers, enzymes, and chelators. The encapsulated breakers are also able to resist degradation that can be problematic at these elevated temperatures.

The encapsulated breaker compositions of the present invention generally comprise: a breaker and an encapsulant that comprises a poly(meth)acrylate blend; wherein the encapsulant encapsulates the breaker.

The breakers can be any material that does not adversely interact or chemically react with the encapsulant to destroy its utility. In some embodiments, the breaker is selected from the group of: enzymes, oxidizers, chelators, acids or their salts, and combinations thereof. Suitable examples of enzymes include, but are not limited to, alpha and beta amylases, amyloglucosidases, invertases, maltases, cellulases, hemicellulases, etc. Suitable examples of oxidizers include, but are not limited to, persulfates (sodium, potassium, ammonium, etc.), perborates, bromates, periodates, chlorates, chlorites, hypochlorites, organic peroxides, etc.) Suitable examples of acids include, but are not limited to, citric acid, fumaric acid, tannic acid, and the like. Suitable examples of chelators include, but are not limited to, ethylenediaminetetraacetic acid (EDTA), nitrilotriacetic acid (NTA), any derivatives of these, and any combinations of oxidizers, acids and chelators. In some embodiments, the breaker is present in an amount ranging from about 0.1 ppt to about 6 ppt.

The term poly(meth)acrylate blend as used herein refers to a polymer blend comprising homopolymer and/or copolymer made from acrylate and methacrylate. In some embodiments, the encapsulant is a blend of poly methyl methacrylate (P(MMA)) and poly methyl methacrylate-co-ethyl acrylate-co-trimethylaminoethyl methacrylate chloride (P(MMA-EA-TMAEMC)).

In some embodiment, the encapsulant is present in an amount ranging from about 1 ppt to about 14 ppt. Preferably, the blend exhibits low permeability to the viscosified treatment fluid which, in turn, leads to the controlled release of breakers.

The encapsulated breakers can be made using known encapsulation techniques, including microencapsulation techniques. The preferred encapsulation techniques include, but are not limited to, a fluidized bed process such as the Wurster process and a modified Wurster process utilizing a top spray method. A spray drying process may also be used as a suitable encapsulation technique.

In some embodiments, the gelling agent in the viscosified treatment fluid may comprise a gelling agent selected from the group of: hydroxyethylcellulose, hydroxyalkylguar, hydroxyalkylcellulose, carboxyalkylhydroxyguar, carboxyalkylhydroxyalkylguar, starch, gelatin, poly(vinyl alcohol), poly(ethylene imine), guar, xanthan, polysaccharide, cellulose, synthetic polymers, any derivatives thereof, and combinations thereof. In some embodiments, the concentration of gelling agents present is from about 30 pounds per gallon (ppg) to about 50 ppg.

In some embodiments, the crosslinking agent comprises a crosslinking agent selected from the group of: boron derivatives, potassium periodate, potassium iodate, ferric iron derivatives, magnesium derivatives, and combinations thereof. Suitable examples of crosslinking agents include, but are not limited to, borate ion, zirconate ion, titanate ion and combinations thereof. In some embodiments, the concentration of crosslinking agents present is from about 0.5 gallons per thousand (gpt) to about 5 gpt.

In certain embodiments, the treatment fluids of the present invention may comprise a plurality of proppant particulates. Particulates suitable for use in the present invention may comprise any material suitable for use in subterranean operations. Suitable materials for these particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention. In certain embodiments, the particulates may be present in the first treatment fluids of the present invention in an amount in the range of from about 60 g/L or 0.5 pounds per gallon ("ppg") to about 3600 g/L or 30 ppg by volume of the treatment fluid.

The present invention provides methods comprising: providing a viscosified treatment fluid having a first viscosity comprising: a gelling agent, a crosslinking agent, a proppant, an aqueous-base fluid, and an encapsulated breaker composition comprising: an encapsulant that comprises a poly (meth)acrylate blend; introducing the viscosified treatment fluid in the subterranean formation; creating or enhancing a fracture in a subterranean formation; and allowing the encapsulated breaker composition to release the breaker so as to reduce the viscosity of the viscosified treatment fluid to a second viscosity. In some embodiments, the encapsulated breaker composition is encapsulated and admixed with the viscosified treatment fluid prior to introduction into the subterranean formation. Optionally, the viscosified treatment fluid may further comprise a pH regulating agent.

In some embodiments, the aqueous-base fluid is any fluid that is water-based. Suitable examples of aqueous-based fluid include, but are not limited to, salt water, brine, water, and the like.

In some embodiments, the viscosified treatment fluid may also comprise unencapsulated breakers. Such mixtures of encapsulated and unencapsulated breakers should speed up the breaking process when desirable.

In some embodiments, the pH regulating agent comprises an agent selected from the group of: alkali metal hydroxide, alkali metal carbonate, bicarbonate, and any mixtures thereof. Without being limited by theory, it is believed that pH regulating agents can be used to adjust pH and help prevent degradation of the viscosified treatment fluid.

The present invention provides methods comprising: providing a viscosified treatment fluid having a first viscosity comprising: a crosslinked gelling agent formed by a reaction comprising a gelling agent and a crosslinking agent, a proppant, an aqueous-base fluid, an encapsulated breaker composition that comprises an encapsulant that comprises a poly (meth)acrylate blend; introducing the viscosified treatment fluid in the subterranean formation; creating or enhancing a fracture in a subterranean formation; and allowing the encapsulated breaker composition to release the breaker so as to reduce the viscosity of the viscosified treatment fluid to a second viscosity. In the preferred embodiment, the breaker is released over a period of time.

In some embodiments, the encapsulated breaker composition is added to the viscosified treatment fluid after the gelling agent and crosslinking agent have crosslinked.

To facilitate a better understanding of the present invention, the following examples of preferred embodiments are given. In no way should the following examples be read to limit, or to define, the scope of the invention.

EXAMPLE 1

The blend of P(MMA) and P(MMA-EA-TMAEMC) was prepared by the following protocol. First, 3.50 g of P(MMA) and P(MMA-EA-TMAEMC) were dissolved in 12 ml of dichloromethane. Next, 1.25 g of breaker particles (<44 μm) were added and the mixture was sonicated for 5 minutes in order to obtain a homogeneous dispersion. The dispersion was then pipetted out into droplets and allowed to dry into circular flakes having a diameter of about 1.0 mm to 1.5 mm. The circular flakes contained the encapsulated breaker that were later tested in rheological experiments described in Example 2 below. The encapsulation of breaker can be performed in large scale using commonly known encapsulation techniques such as spray drying and fluidized bed coating.

EXAMPLE 2

In this Example, rheological test were performed on various breakers with (obtained by the method described in Example 1) and without breaker. The encapsulated breakers were tested in a CHANDLER 5550 rheometer with B5X bob at 95 rpm. The performance evaluations were performed on carboxymethyl hydroxypropyl guar (CMHPG) and hydroxypropyl guar (HPG) based fracturing fluid whose compositions are shown in Tables 1-3.

TABLE 1

Composition for 5.4 mg/L (45 lb/Mgal) HPG @ 250° F.

| Components | Amount per 1000 mL |
|---|---|
| Tap Water | 1000 mL |
| Gelling Agent: HPG (WG-11) | 5.4 g |
| Clay Control: alkylated quaternary chloride (CLAYFIX II ™) | 2 gpt |
| Buffering Agent: ammonium acetate (BA-20 ™) | 0.2 gpt |
| Surfactant: non-ionic surfactant (LOSULF 300M ™) | 1 gpt |
| Gel Stabilizer: sodium thiosulfate (GELSTA ™) | 20 gpt |
| Buffering Agent: sodium hydroxide (MO-67 ™) | To adjust pH 12 |
| Crosslinking agent: CL-28M ™ (boron crosslinker) | 4 gpt |

TABLE 2

Composition for 5.4 mg/L (45 lb/Mgal) HPG @ 275° F.

| Components | Amount per 1000 mL |
|---|---|
| Tap Water | 1000 mL |
| Gelling Agent: HPG (WG-11) | 5.4 g |
| Clay Control: alkylated quaternary chloride (CLAYFIX II ™) | 2 gpt |
| Buffering Agent: ammonium acetate (BA-20 ™) | 0.2 gpt |
| Surfactant: non-ionic surfactant (LOSURF 300M ™) | 1 gpt |
| Gel Stabilizer: sodium thiosulfate (GELSTA ™) | 30 gpt |
| Buffering Agent: sodium hydroxide (MO-67 ™) | To adjust pH 12.1 |
| Crosslinking agent: CL-28M ™ (boron crosslinker) | 4 gpt |

TABLE 3

Composition for 3.6 mg/L (30 lb/Mgal) CMHPG

| Components | Amount per 1000 mL |
|---|---|
| Tap Water | 1000 mL |

TABLE 3-continued

Composition for 3.6 mg/L (30 lb/Mgal) CMHPG

| Components | Amount per 1000 mL |
|---|---|
| Gelling Agent: CMHPG (WG-18) | 3.6 g |
| Clay Control: alkylated quaternary chloride (CLAYFIX II ™) | 2 gpt |
| Buffering Agent: ammonium acetate (BA-20 ™) | 0.2 gpt |
| Surfactant: non-ionic surfactant (LOSURF300M ™) | 1 gpt |
| Gel Stabilizer: sodium thiosulfate (GELSTA ™) | 12 gpt |
| Buffering Agent: sodium hydroxide (MO-67 ™) | To adjust pH 10.5 |
| Crosslinking agent: triethanolamine zirconate (CL-37 ™) diluted with 1:1 methanol | 1 gpt |

Figure 2:
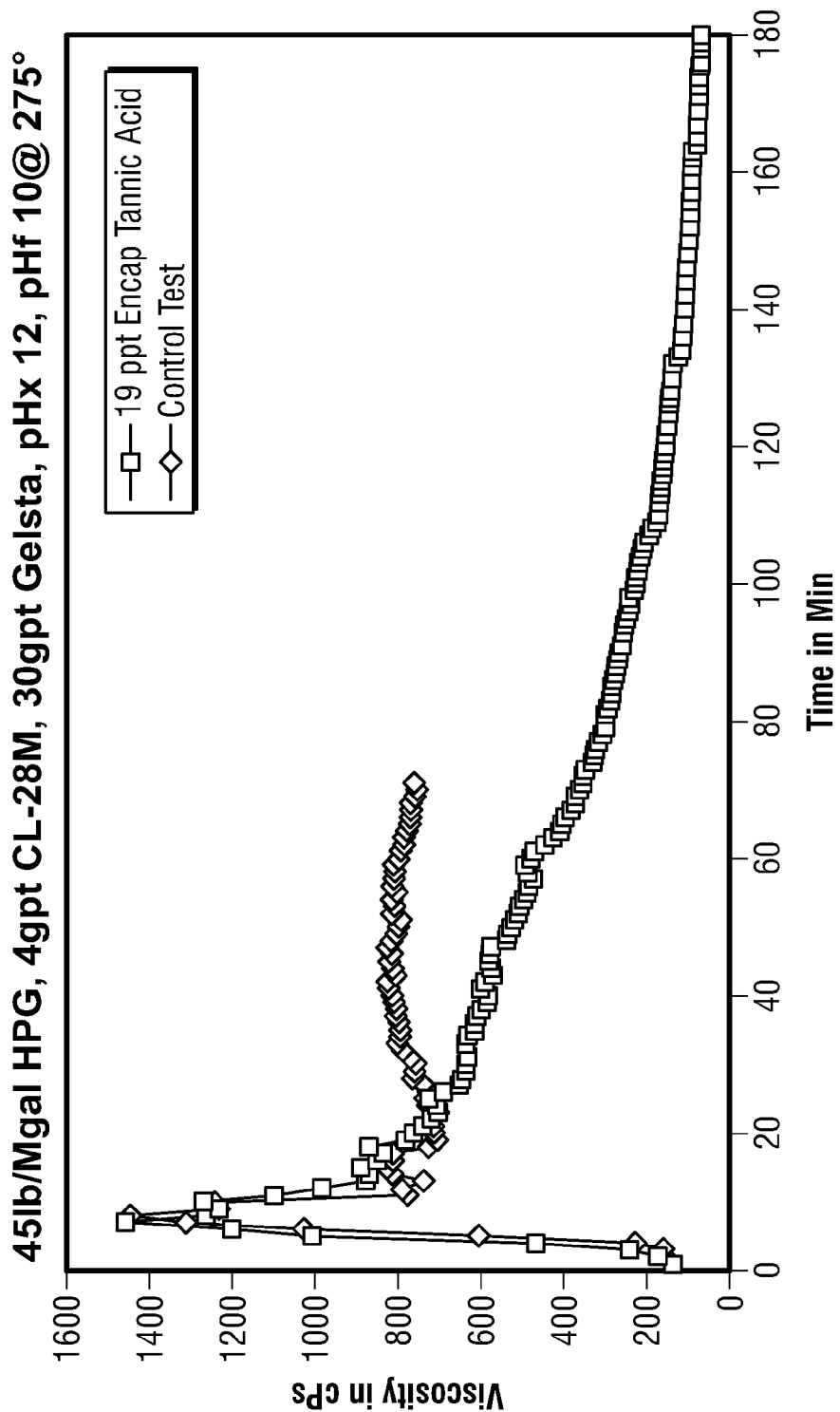
FIG. 2 shows rheological tests performed as described in Example 2.

First, encapsulated tannic acid was tested for its ability to reduce the viscosity of hydroxypropyl guar (HPG) at 121° C. (250° F.) (pHx 11.5; pHf 9.8). pHx is the pH of the crosslinked fracturing fluid recorded just after loading the sample on a viscometer for rheological testing. pHf is the final pH of the crosslinked fracturing fluid after completion of the test. FIG. 1 shows the results of 19 ppt encapsulated tannic acid and controlled test sample (no breaker) breaking 5.4 mg/L (45 lb/Mgal) of HPG. As shown in FIG. 1, encapsulated tannic acid is able to delay the breaking of HPG while also nearly reducing the viscosity of HPG all the way below 100 cp. FIG. 2 shows the results of a similar test performed at 135° C. (275° F.) (pHx 12; pHf 10). As shown in FIG. 2, encapsulated tannic acid is able to delay the breaking of HPG while also nearly reducing the viscosity of HPG below 50 cp. As expected, the control sample showed constant viscosity.

Figure 3:
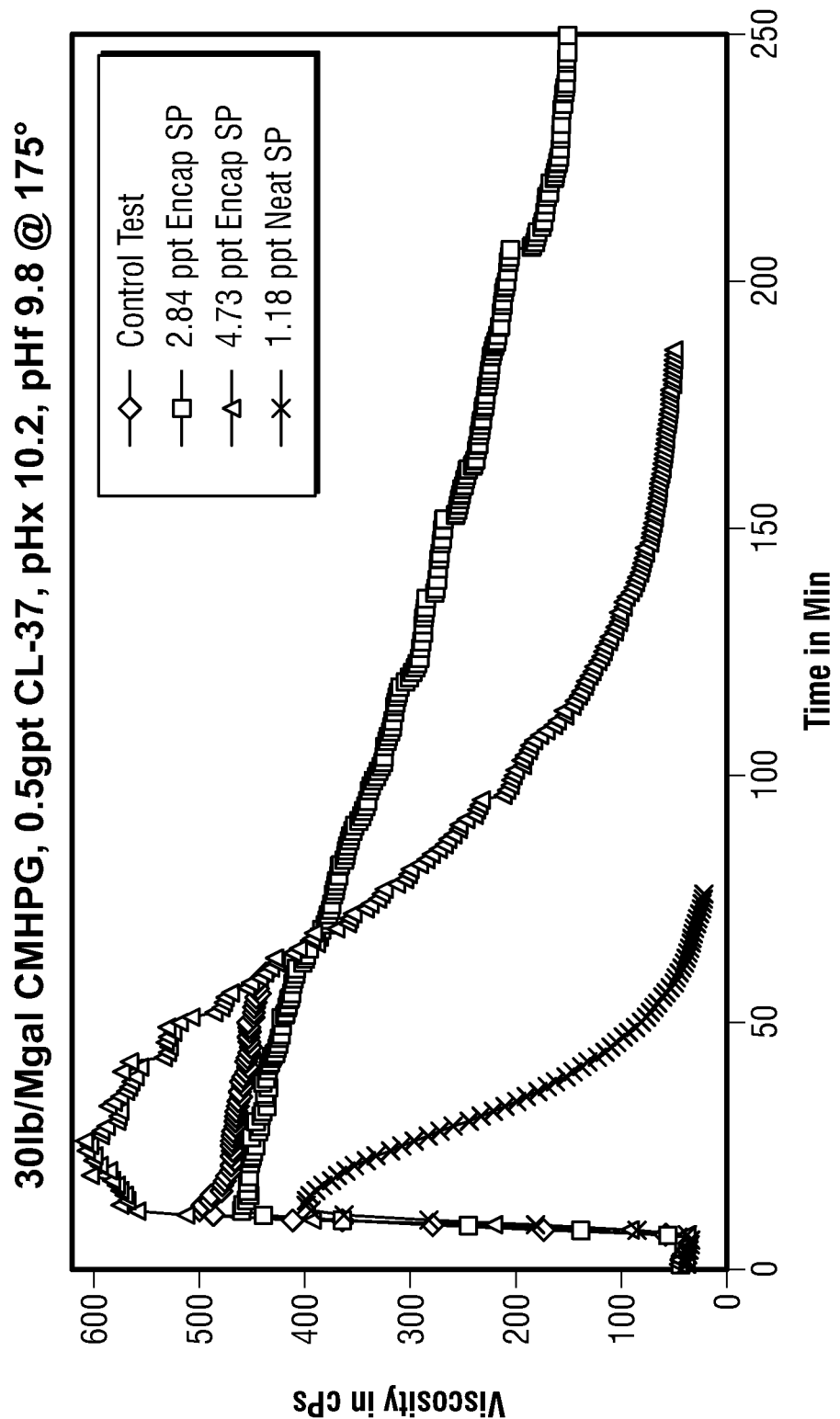
FIG. 3 shows rheological tests performed as described in Example 2.
Figure 4:
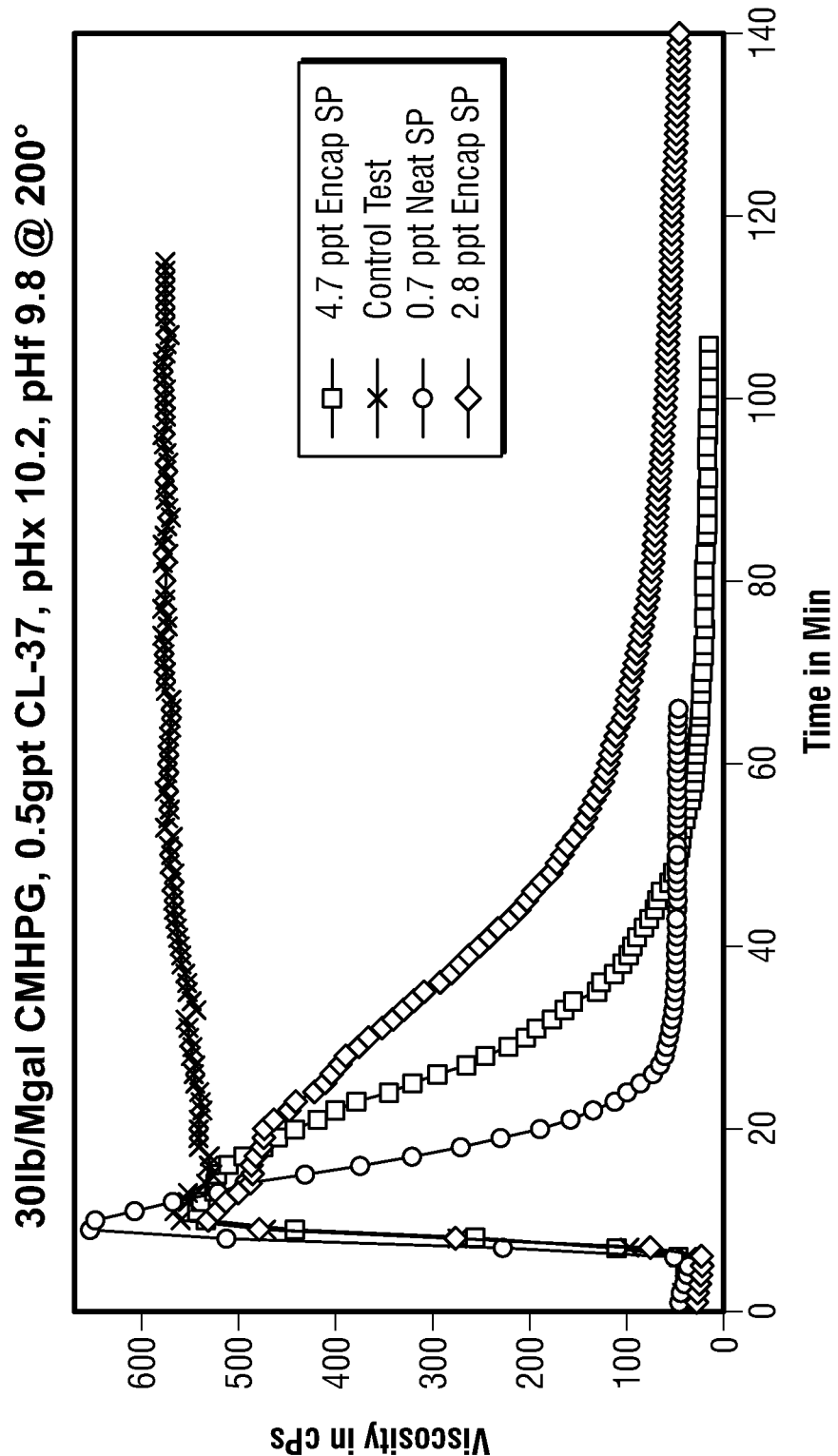
FIG. 4 shows rheological tests performed as described in Example 2.

FIGS. 3 and 4 show rheological tests performed on encapsulated sodium persulfate (SP) at two different temperatures. FIG. 3 shows the ability of encapsulated sodium persulfate to reduce the viscosity of 3.6 mg/L (30 lb/Mgal) carboxymethyl hydroxypropyl guar (CMHPG) at 79° C. (175° F.) (pHx 10.2; pHf 9.8). As shown in FIG. 3, the 2.84 ppt and 4.73 ppt encapsulated SP samples were able to delay the breaking of CMHPG through controlled release of SP relative to 1.18 ppt neat SP. FIG. 4 shows encapsulated SP tests at 93° C. (200° F.) (pHx 10.2; pHf 9.8). As shown in FIG. 4, encapsulated SP (4.7 ppt and 2.8 ppt) samples were able to delay the breaking of CMHPG relative to 0.7 ppt SP.

Figure 5:
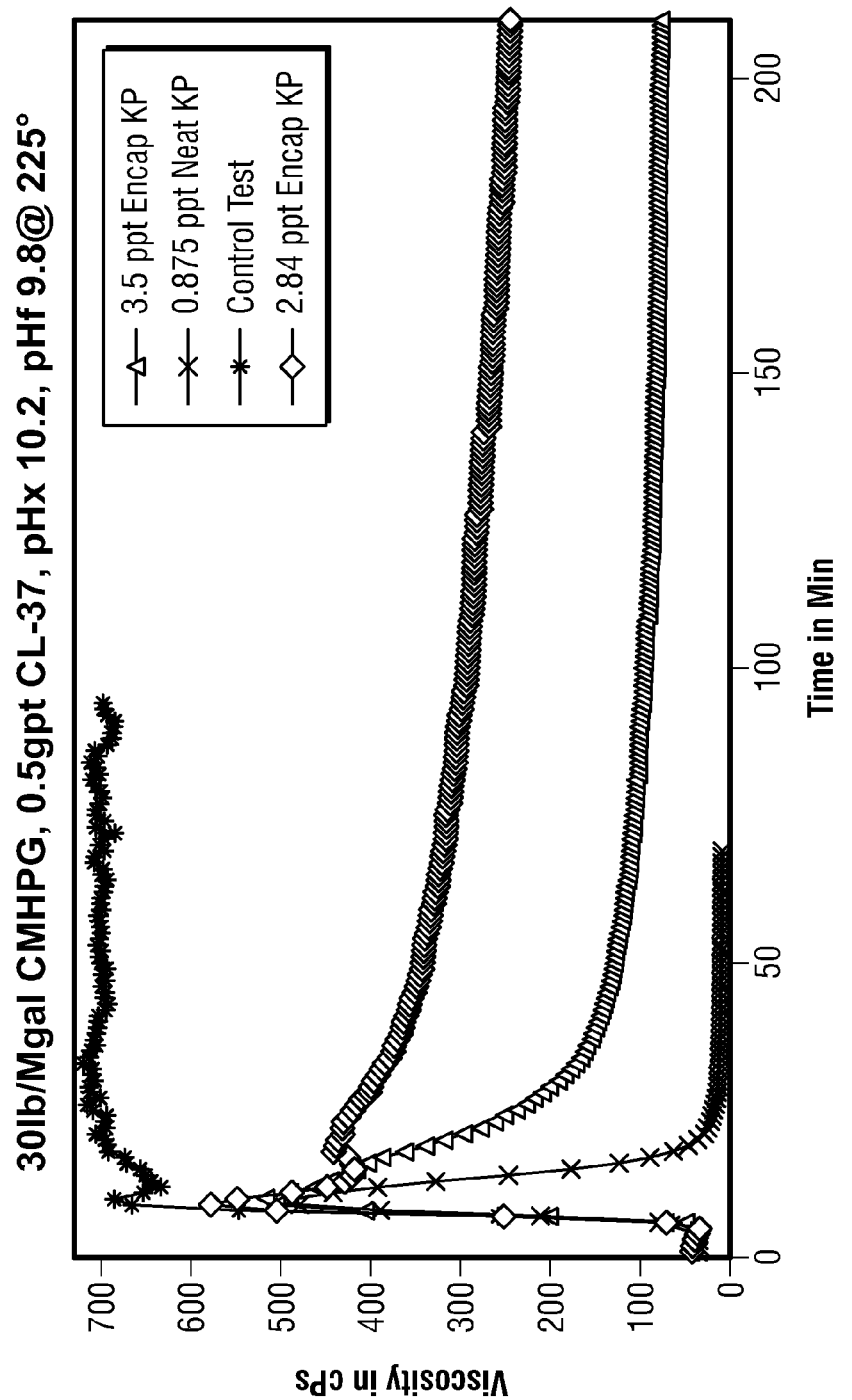
FIG. 5 shows rheological tests performed as described in Example 2.
Figure 6:
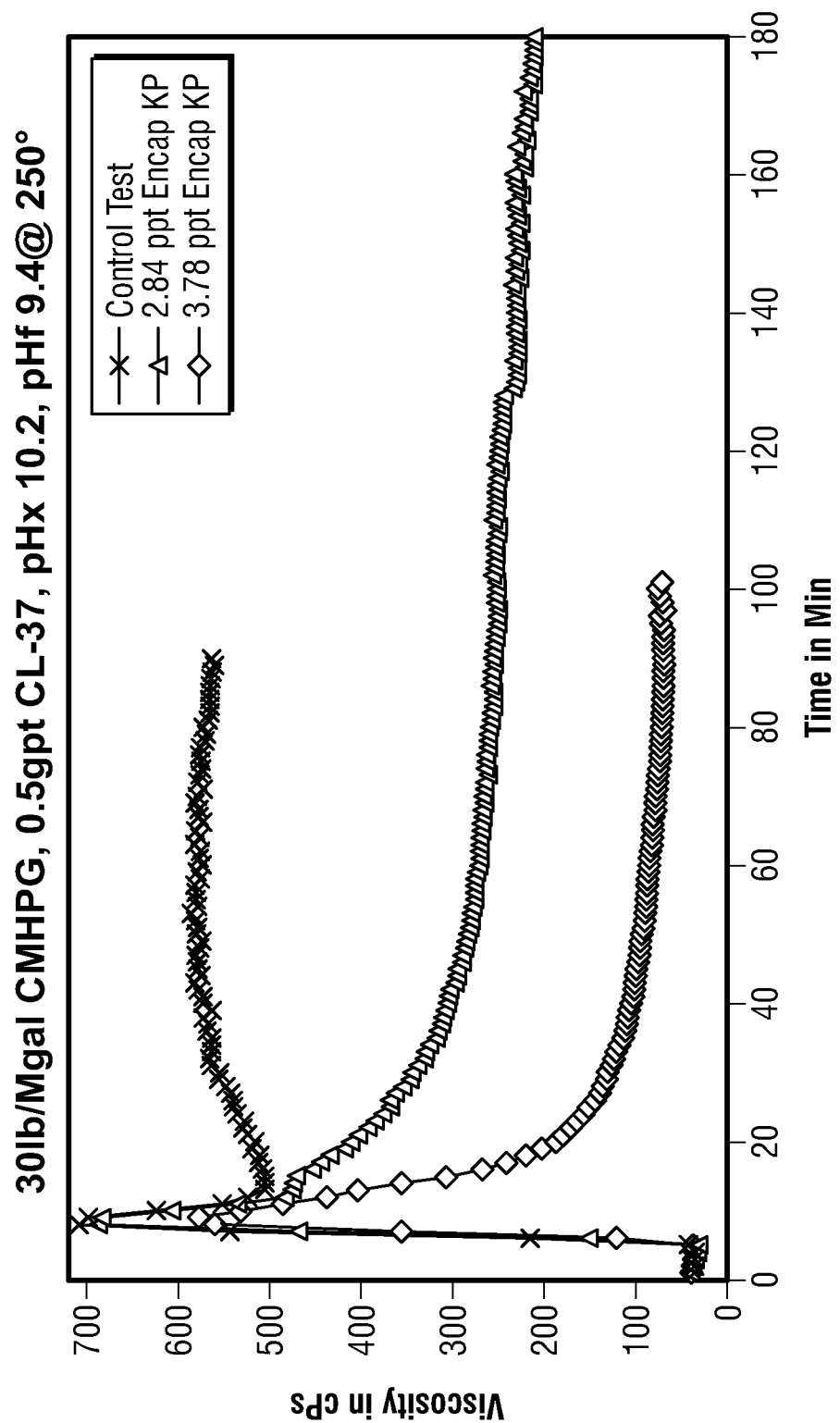
FIG. 6 shows rheological tests performed as described in Example 2.
Figure 7:
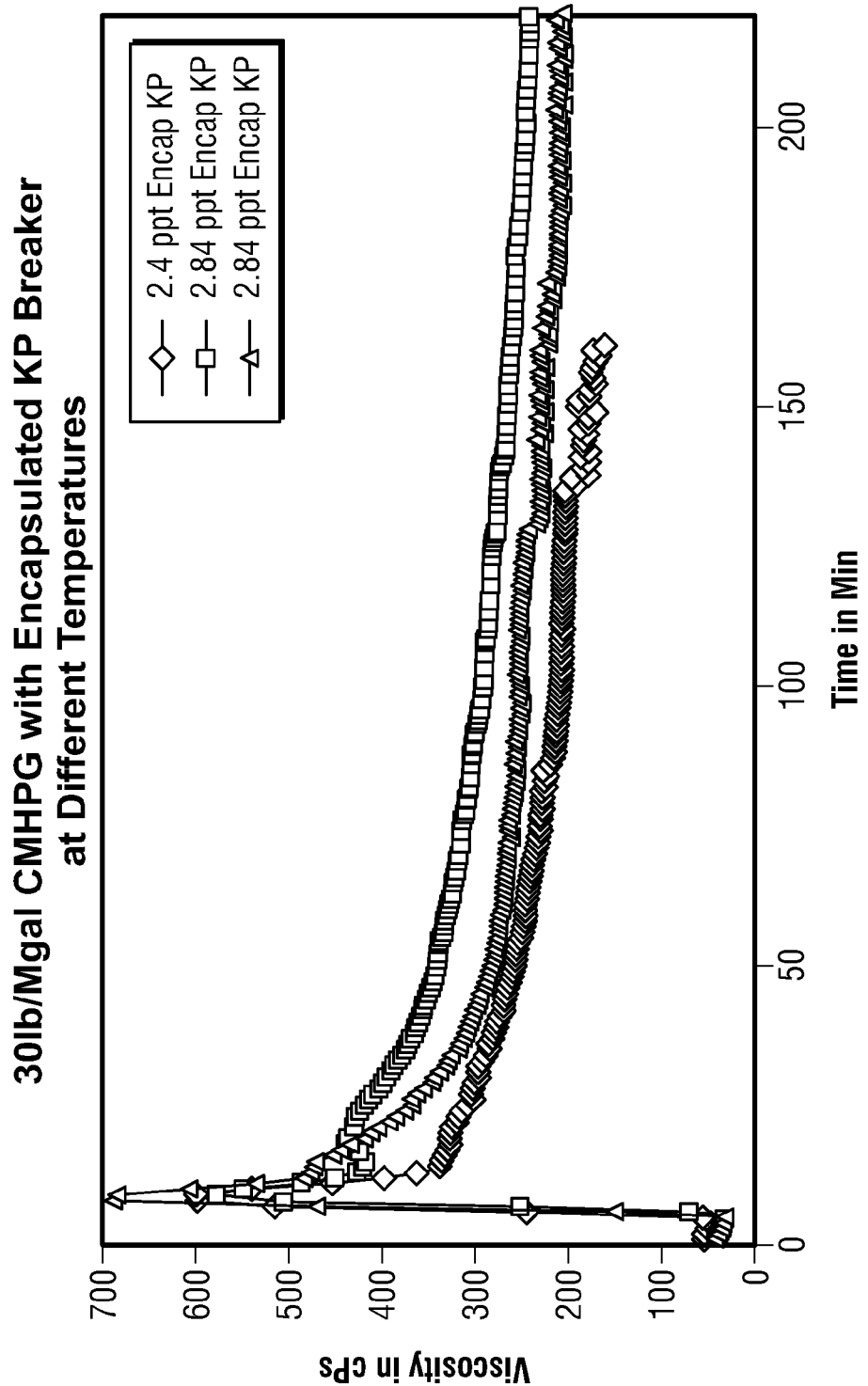
FIG. 7 shows rheological tests performed as described in Example 2.

FIGS. 5, 6, and 7 show rheological tests performed on encapsulated potassium persulfate (KP) at three different temperatures. FIG. 5 shows that encapsulated KP (3.5 ppt and 2.84 ppt) samples delayed the breaking of 3.6 mg/L (30 lb/Mgal) CMHPG at 107° C. (225° F.) (pHx 10.2; pHf 9.8) relative to 0.875 ppt neat KP sample. FIG. 6 shows that encapsulated KP (3.78 ppt and 2.84 ppt) samples were able to delay the breaking of 3.6 mg/L (30 lb/Mgal) CMHPG at 121° C. (250° F.) (pHx 10.2; pHf 9.4) relative to a control sample. FIG. 7 summarizes the 2.4 ppt and 2.84 ppt encapsulated KP results at 107° C. (225° F.), 121° C. (250° F.), and 135° C. (275° F.).

This Example demonstrates, among many things, that encapsulated breakers provide significant delays in the breaking of viscosified fluids compared to unencapsulated breakers. Moreover, these encapsulated breakers are also able to nearly reduce viscosity of the viscosified fluids all the way down to less than 50 cP.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a viscosified treatment fluid having a first viscosity comprising: a gelling agent, a crosslinking agent, a proppant, an aqueous-base fluid, and an encapsulated breaker composition comprising: an encapsulant selected from the group consisting of: poly(methacrylate); a copolymer of methacrylate and acrylate; a blend of poly(methyl methacrylate) and poly(methyl methacrylate-co-ethyl acrylate-co-trimethylaminoethyl methacrylate chloride; and combinations thereof;
   introducing the viscosified treatment fluid in the subterranean formation;
   creating or enhancing a fracture in a subterranean formation; and
   allowing the encapsulated breaker composition to release the breaker so as to reduce the viscosity of the viscosified treatment fluid to a second viscosity.

2. The method of claim 1 wherein the gelling agent comprises a gelling agent selected from the group consisting of: hydroxyethylcellulose, hydroxyalkylguar, hydroxyalkylcellulose, carboxyalkylhydroxyguar, carboxyalkylhydroxyalkylguar, hydroxyethylcellulose, starch, gelatin, poly(vinyl alcohol), poly(ethylene imine), guar, xanthan, polysaccharide, cellulose, synthetic polymer, any derivative of thereof, and any combination thereof.

3. The method of claim 1 wherein the crosslinking agent comprises a crosslinking agent selected from the group consisting of: a borate ion, a zirconate ion, a titanate ion and any combination thereof.

4. The method of claim 1 wherein the viscosified treatment fluid is introduced in a subterranean formation having a temperature in the range of about 150° F. to about 300° F.

5. The method of claim 1 wherein the encapsulant is present in an amount ranging from about 1 ppt to about 14 ppt.

6. The method of claim 1 wherein the breaker is present in an amount ranging from about 0.1 ppt to about 6 ppt.

7. The method of claim 1 wherein the viscosified treatment fluid further comprises a pH regulating agent.

8. The method of claim 7 wherein the pH regulating agent comprises an agent selected from the group consisting of: an alkali metal hydroxide, an alkali metal carbonate, a bicarbonate, and any mixture thereof.

9. A method comprising:
providing a viscosified treatment fluid having a first viscosity comprising: a crosslinked gelling agent formed by a reaction comprising a gelling agent and a crosslinking agent, a proppant, an aqueous-base fluid, an encapsulated breaker composition that comprises an encapsulant selected from the group consisting of: poly (methacrylate); a copolymer of methacrylate and acrylate; a blend of poly(methyl methacrylate) and poly (methyl methacrylate-co-ethyl acrylate-co-trimethylaminoethyl methacrylate chloride; and combinations thereof;
introducing the viscosified treatment fluid in the subterranean formation;
creating or enhancing a fracture in a subterranean formation; and
allowing the encapsulated breaker composition to release the breaker so as to reduce the viscosity of the viscosified treatment fluid to a second viscosity.

10. The method of claim 9 wherein the gelling agent comprises a gelling agent selected from the group consisting of: hydroxyethylcellulose, hydroxyalkylguar, hydroxyalkylcellulose, carboxyalkylhydroxyguar, carboxyalkylhydroxyalkylguar, hydroxyethylcellulose, starch, gelatin, poly(vinyl alcohol), poly(ethylene imine), guar, xanthan, polysaccharide, cellulose, synthetic polymer, any derivative of thereof, and any combination thereof.

11. The method of claim 9 wherein the crosslinking agent comprises a crosslinking agent selected from the group consisting of: a borate ion, a zirconate ion, a titanate ion and any combination thereof.

12. The method of claim 9 wherein the encapsulant is present in an amount ranging from about 1 ppt to about 14 ppt.

13. The method of claim 9 wherein the breaker is present in an amount ranging from about 0.1 ppt to about 6 ppt.

14. The method of claim 9 wherein the viscosified treatment fluid further comprises a pH regulating agent.

15. The method of claim 14 wherein the pH regulating agent comprises an agent selected from the group consisting of: an alkali metal hydroxide, an alkali metal carbonate, a bicarbonate, and any mixture thereof.

16. An encapsulated breaker composition comprising:
a breaker comprising at least one breaker selected from the group consisting of: an enzyme, an oxidizer, a chelator, an acid; and
an encapsulant selected from the group consisting of: poly (methacrylate); a copolymer of methacrylate and acrylate; a blend of poly(methyl methacrylate) and poly(methyl methacrylate-co-ethyl acrylate-co-trimethylaminoethyl methacrylate chloride; and combinations thereof, wherein the encapsulant encapsulates the breaker.

17. The encapsulated breaker composition of claim 16 wherein the breaker comprises a breaker selected from the group consisting of: citric acid, fumaric acid, sodium persulfate, potassium persulfate, ammonium persulfate, tannic acid, ethylenediaminetetraacetic acid, nitrilotriacetic acid, alpha amylase, beta amylase, amyloglucosidase, invertase, maltase, cellulase, hemicellulase, and any combination thereof.

18. The encapsulated breaker composition of claim 16 wherein the encapsulant is present in an amount ranging from about 1 ppt to about 14 ppt.

19. The encapsulated breaker composition of claim 16 wherein the breaker is present in an amount ranging from about 0.1 ppt to about 6 ppt.

* * * * *